Patented Feb. 13, 1951

2,541,655

UNITED STATES PATENT OFFICE 2,541,655

ALKYLATION OF AROMATIC AMINES

William W. Levis, Jr., Wyandotte, Mich., assignor to Sharples Chemicals Inc., a corporation of Delaware No Drawing. Application May 15, 1946, Serial No. 670,047

18 Claims. (Cl. 260—577)

The present invention relates to the preparation of aromatic amines which are N-substituted by aliphatic radicals. More specifically, it relates to an improved procedure for causing an aliphatic halide to condense with a primary or secondary aromatic amine to effect substitution of the aliphatic radical for N-attached hydrogen of the aromatic amine.

As applied to the manufacture of tertiary amines, the fundamental reaction may be represented by the following equation:

$$R'NH_2 + 2RX \rightarrow R'NR_2 \cdot HX + HX$$

wherein R' and R designate aryl and aliphatic groups respectively, and X is a halogen radical.

The invention provides an improved neutralizing operation. It also provides a catalyst which causes the reaction to proceed much more rapidly than previously known catalysts for this type of reaction.

While the invention is applicable to condensation of aliphatic halides with aromatic amines, regardless of whether the aromatic amine be a primary or secondary amine, and while it is applicable regardless of whether 1 or 2 aliphatic radicals are to be condensed with the aromatic amine, it was developed in connection with research to improve condensation of two molecules of a primary alkyl halide with a single molecule of aromatic amine to form tertiary amines, and it will accordingly be described primarily in reference to a process of this kind, as illustrated by the foregoing equation. If an attempt is made to effect a condensation of this type merely by bringing together the stoichiometric proportions of aryl amine and aliphatic halide, serious obstacles are encountered. The evolved halogen acid forms salts by combination not only with the reaction product, as indicated by the above equation, but also with the primary amine and the intermediately formed secondary amine. These salts are relatively unreactive and their formation, therefore, effectively prevents a satisfactory conversion of the primary amine into the tertiary amine. A further difficulty results from the fact that the hydrohalogen salts of primary aromatic amines are relatively insoluble in the reaction mixture and consequently precipitate out. The presence of these solids is undesirable, for they interfere with the proper agitation of the reactants and also may be deposited in such a coherent and impervious state that their subsequent solution and recovery is unduly time-consuming.

Numerous expedients have been employed in the past in the conducting of this condensation reaction for the purpose of overcoming to some extent the above-mentioned problems. For example, an aqueous solution of a soluble alkali may be incorporated with the main reactants either in a single stage, or in multiple stages with the intermediate separation and removal of the aqueous layer. Such a process, while eliminating the deposition of solids, results in low conversions to the tertiary amine, especially when the economically desirable but relatively unreactive aliphatic chlorides are employed. Apparently the presence of appreciable amounts of water inhibits the condensation, and, in addition, may often cause hydrolysis of the aliphatic halide with attendant loss in yield. Acid-nuetralizing agents which have been proposed include tertiary and secondary amines and alkaline earth metal oxides and hydroxides such as lime. The organic bases, however, are expensive, and lime, though inexpensive, forms salts with the released halogen acids which are very insoluble in the reacting mixture.

A primary object of my invention is to provide an economical process for condensing primary or secondary aromatic amines with aliphatic halides to form tertiary amines in good yield and conversion with the complete or substantial elimination of the formation of solid products during the reaction. Other specific objects and advantages will be set forth in the following detailed description of my process.

I have discovered that the condensation of primary or secondary aryl amines with aliphatic halides can be effected readily to produce tertiary amines in excellent yields and conversions by the use, as acid-binding agent, of an inorganic base of a metal selected from the class consisting of magnesium, and zinc. Thus the acid-binding substances to which the present invention pertains are MgO, Mg(OH)$_2$, ZnO, and Zn(OH)$_2$. It should be noted that the metals of this defined class belong to group II-$b$ of the periodic system and are considered in the chemical art to be distinct from the alkaline earth metals of group II-$a$ such as calcium, strontium and barium. Although magnesium has properties which cause it to be classified sometimes in subgroup $a$, sometimes in subgroup $b$, its oxide behaves in respect to the present invention unlike those of the alkaline earth metals.

The oxygen-containing bases of my invention have the unique and unexpected property, not exhibited by the oxides or hydroxides of the alkaline earths or by other inorganic bases, of combining with the halogen acids, evolved in the formation of the tertiary amines, to form salts and complexes which are soluble in the reacting mixture. In addition it has been found that they cause the desired reaction to occur more rapidly and to proceed further toward completion than when other inorganic bases are employed, this accelerating effect being especially pronounced in the case of the zinc compounds.

The manner in which the present invention may be practiced is, for the sake of simplicity, described in relation to the preparation of dibutylaniline at atmospheric pressure. A flask of appropriate dimensions, equipped with a mercury seal stirrer, a dropping funnel, a water-cooled reflux condenser, and a decanter, is charged with 10 moles of aniline and is heated to a temperature between 180° and 190° C. About 3 moles of n-butyl chloride are gradually introduced. At this time 2 moles of powdered zinc oxide are charged. The water formed by addition of the zinc oxide is preferably withdrawn continuously into the decanter during the course of the reaction. The procedure is repeated, three additional moles of zinc oxide being introduced when the total addition of butyl chloride amounts to about 7 moles. Without further addition of oxide the reaction is continued until a total of 18.4 moles of butyl chloride have been consumed over a period of about four hours.

The final reaction mixture is clear and free of solids at 100° C. It is agitated with an aqueous solution of caustic soda to give a readily separable oil layer and an aqueous layer containing most of the zinc base. The oil is again caustic washed, dried, and finally fractionally distilled at atmospheric pressure. Approximately 7.3 moles of a close-boiling cut of dibutyl aniline as well as 1.5 moles of monobutyl aniline are recovered.

Although I prefer to employ a molecular deficiency of metal base, and to introduce it gradually or in increments after a part of the condensation has occurred, my process may be operated successfully by the use of somewhat more than one or slightly less than half an equivalent of the metal base, which may all be introduced prior to the initiation of the reaction. Because the rate of reaction appears to be reduced by the presence of excessive amounts of strongly basic substances and since the oxides and hydroxides of this invention are insoluble (though readily dispersible) in the reactants, it is advantageous to employ only a quantity sufficient to prevent excessive accumulation of amine salts, the exact optimum quantity and rate of addition depending upon the particular reactants and other prevailing conditions.

The metal bases of the present invention are themselves insoluble in the reactants and this fact should be considered in relationship to the particle size and mode of incorporating them into the reaction. It is desirable that the particles should be sufficiently small to be readily maintained in suspension by the stirrer or other agitating system being employed and also to be readily neutralized by the released halogen acid. Metal oxides capable of passing a 25-mesh screen have been found to be satisfactory when standard laboratory equipment is used. Appreciably larger particle sizes may be tolerated in autoclaves and other equipment of pilot plant or larger dimensions. In general metal bases in pulverulent form are preferred.

The aromatic amines applicable to my process include not only aniline and its homologues such as toluidine and xylidine but also phenyl amines in which the aromatic nucleus is substituted by relatively stable groups such as methoxy, ethoxy, nitro and halogen. Polynuclear amines such as naphthylamine may be employed.

It is, of course, understood that my process is applicable to the treatment of secondary alkyl aryl amines since said secondary amines are necessarily formed as intermediates by the nature of the reaction. Thus the amines falling within the scope of the present invention are those aromatic amines which contain at least one hydrogen attached to the amino nitrogen.

The aliphatic halides which may be condensed with the aryl amines by the procedure of my invention include the various compounds of this description which are capable of entering into the fundamental reaction of Equation 1. Thus are included the simple alkyl halides such as methyl, ethyl, propyl, butyl, hexyl, heptyl, octyl and even higher homologs, as well as such compounds in wihch one or more hydrogens have been substituted by other radicals or in which two adjacent hydrogens have been removed to form an olefinic linkage between the respective carbons. In particular the primary alkyl chlorides and alkyl bromides having from 1 to 8 carbon atoms in their alkyl radicals are well adapted for use in the process of the present invention.

The condensation may be conducted at temperatures between 150° C. and 250° C., although at the higher limit substantial C-alkylation may occur, and at the lower limit the reaction velocity becomes undesirably slow. Best results are normally attained by the use of temperatures between 180° and 200° C.

When operating at atmospheric pressure the lower aliphatic halides, because of their volatility, must be introduced gradually into the higher boiling components of the reaction; but when operating under superatmospheric pressures or when the less volatile halides are used, all or any desired fraction of the halide may be mixed initially with the amine. The use of superatmospheric pressure is not necessary, but may reduce the reaction period by increasing the effective concentration of those aliphatic halides which are normally gaseous at the temperature of the reaction.

The zinc bases cause a more rapid condensation than do the bases of magnesium, and it has been found that the velocity of reaction can in every instance be further increased by introducing zinc chloride into the reaction mixture regardless of the particular metal base being used. As much as 0.3 molecular equivalents (based upon aliphatic halide) may be employed to advantage. This feature of use of zinc chloride as a catalyst has an important effect in speeding up the reaction, regardless of the details as to addition of metal oxides or hydroxides which may be employed.

Any secondary amine produced, as for example, monobutylaniline, may be recovered and converted into the desired tertiary amine by a treatment analogous to that accorded the primary amine, or it may be recycled after being mixed with additional primary amine.

The following specific examples illustrate the practice of this invention under a variety of conditions, both as regards the nature of the reactants and the technique of operation.

*Example 1*

The reaction was conducted in a three-necked, five liter glass flask equipped with refluxing condenser, a decanter, a motor driven mercury seal, stirrer, and a dropping funnel extending well toward the bottom of the vessel. 10 moles of aniline were placed in the flask and were heated to a temperature between 180° C. and 190° C. Normal butyl chloride was then introduced gradually from the dropping funnel at a rate approximating its rate of condensation with the aniline until 5.0 moles had been consumed. At this time 6.0 moles of magnesium oxide powder were progressively added to the reaction mixture and the reaction was continued until 18.2 moles of butyl chloride had been charged, the total reaction time being ten hours and fifteen minutes.

The crude product, a clear solution, was agitated with one liter of water at 90–100° C. for 15 minutes; the oil layer was separated and washed with an aqueous solution of caustic soda. It was then fractionally distilled in a four-foot packed column. The conversion to N,N-dibutyl aniline was 68.5%.

Example 2

Using an apparatus and a procedure substantially similar to those of Example 1, 6 moles of aniline were treated with a total of 11.3 moles of n-butyl chloride over a period of 8 hours. 3 moles of MgO were introduced in three equal increments after the addition of 2, 4 and 6 moles of butyl chloride, respectively.

The conversion to N-monobutylaniline was 12.2% and to N,N-dibutylaniline was 69.2%.

Example 3

In a similar manner a mixture of 6.5 moles of aniline and 3.5 moles of N-monobutylaniline was treated with 13.3 moles of n-butyl chloride in the presence of 3.25 moles of MgO, the oxide being introduced after 3.25 moles of the chloride had reacted. The reaction period was 7.5 hours and the conversion, based on aniline, to N,N-dibutylaniline was 91.7%.

Example 4

The procedure of Example 3 was repeated with the exception that the MgO was introduced prior to the initiation of the reaction. The earlier stage of the reaction was relatively slow, and a total of 9 hours was required to convert 91% of the aniline to the desired product.

Example 5

By the general procedure of Example 1, 10 moles of aniline were caused to react with 18.4 moles of n-butyl chloride in the presence of 6 moles of powdered zinc oxide, the latter being introduced in two stages corresponding to the addition of 3.25 and 6.5 moles of butyl chloride, respectively. The reaction mixture was washed with hot NaOH solution and separated by gravity into an upper oil layer containing the reaction product, a lower water layer, and zinc hydroxide, which settled through the liquid phases. A conversion of 72.9% of aniline to N,N-dibutylaniline was realized in 3 hours and 35 minutes.

Example 6

By repeating the experiment of Example 5, but with the introduction of all the zinc oxide at the start, 10 hours was required to convert 75% of the aniline to the desired product.

Example 7

The procedure of Example 5 was again repeated with the single modification that 0.5 mole of $ZnCl_2$ was introduced at the start. A conversion of 76.7% was attained in two hours and 30 minutes.

Example 8

The procedure of Example 7 was repeated using instead of aniline, N-monobutylaniline. In five hours 94.0% of the charged amine was converted N,N-dibutylaniline.

Example 9

In a manner similar to that of Example 1, n-amyl chloride and aniline are condensed in the presence of MgO, half a mole of the latter per mole of aniline being charged in three stages. A conversion of 71% to N,N-diamylaniline, boiling at 300°–303° C. at 760 mm., is obtained after a reaction period of seven hours.

Example 10

4.07 moles of p-anisidine and 8.8 moles of n-butyl chloride were condensed at 180°–190° C. with the aid of 2.5 moles of ZnO, the latter being introduced gradually as the reaction proceeded. The conversion after 2 hours and 10 minutes was 85% to N,N-dibutylanisidine which boiled between 298° and 302° C. at 760 mm.

Example 11

By the procedure of Example 1, six moles of aniline were treated with ethyl chloride, 4 moles of ZnO being progressively introduced as the condensation proceeded. In this instance, however, the effluent ethyl chloride was not recondensed and returned to the reaction mixture so that a considerable excess was added. A conversion of 63% of the aniline to N,N-diethyl aniline, boiling in the range 214°–216° C., was obtained in 13 hours.

Example 12

Normal octyl bromide is condensed with aniline by a procedure substantially as described in Example 1, 0.7 mole of $Mg(OH)_2$ per mole of aniline being introduced as the reaction progresses. A conversion of 80% of the aniline to N,N-dioctylaniline is attained after a reaction period of 5 hours.

Example 13

A 5 gallon, glass-lined pressure resistant vessel equipped with agitator, recanter and appropriate fittings is charged with 20 moles of aniline, 40 moles of n-butyl chloride and 22 moles of magnesium oxide. The contents are maintained in a state of agitation for seven hours at 185° C. and an average pressure of 130 p. s. i., water being withdrawn continuously. The temperature is then reduced to 100° C.; the pressure is released, then two gallons of water are introduced slowly. After further agitation with the oil, the water phase is decanted and the oil is washed with about 40 moles of aqueous caustic soda. The phases are permitted to stratify, and the lower layer consisting essentially of water, magnesium oxide and sodium chloride is withdrawn. The oil layer is fractionally distilled to effect the separation of the various components, and 14.5 moles of relatively pure N,N-dibutyl aniline, distilling at 265°–280° C., is recovered.

Attempts to utilize metal bases other than those of Mg and Zn are described in the following examples.

Comparative Example 14

A reaction flask was charged with 6 moles of aniline to which 2 moles of n-butyl chloride were added slowly while the temperature was maintained at 180°–190° C. Three moles of cupric oxide were then introduced in increments during the condensation of two additional moles of the chloride. The reaction practically ceased by the time this point was reached and fumes of HCl were evolved. The conversion to N,N-dibutylaniline was 17.6%.

*Comparative Example 15*

The procedure of Example 14 was repeated with the substitution of barium hydroxide for cupric oxide. The reaction mixture contained considerable quantities of solids which persisted throughout the period of reaction. A conversion of 29.2% to N,N-dibutylaniline was attained after a condensation period of 9 hours and 25 minutes.

*Comparative Example 16*

The barium hydroxide of Example 15 was replaced with strontium oxide. The reaction mixture became almost rigid by the time 3.3 moles of butyl chloride had been condensed, so the experiment had to be discontinued.

*Comparative Example 17*

The experiment of Example 16 was repeated using calcium oxide, and similar results were obtained.

While the invention has been described primarily in reference to condensation of two molecules of aliphatic halide with a single molecule of aromatic amine to form a tertiary amine, the use of the neutralizing agents and zinc chloride catalyst of the invention may be applied in condensing a single molecule of aliphatic halide with a single molecule of primary or secondary aromatic amine. The following example illustrates condensation of aniline with n-butyl chloride to form a product consisting primarily of N-mono-n-butylaniline.

*Example 18*

A reaction flask was charged with 10 moles of aniline, and 4 moles of n-butyl chloride were added slowly while the temperature was maintained at 180°–190° C. 1.5 moles of zinc oxide were then introduced and 3 additional moles of the butyl chloride were added slowly. One additional mole of zinc oxide was then added and 3.5 moles of the butyl chloride were thereafter added to complete the reaction. The reaction was completed in 1 hour and 45 minutes to give a clear product containing no remaining zinc oxide. Upon working up this product, there were obtained 1.9 moles of aniline, 5.8 moles of N-mono-n-butylaniline and 2.0 moles of N,N-di-n-butyl-aniline.

From the foregoing it will be clear that various modifications of the invention may be practiced and I do not therefore wish to be limited except by the scope of the following claims.

I claim:

1. In a process for the production of alkyl aryl amines by the condensation of an alkyl halide having less than 9 carbon atoms with an aromatic amine having the formula:

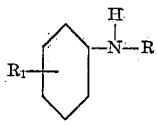

in which R is one of the group consisting of hydrogen and alkyl radicals containing less than 9 carbon atoms, and $R_1$ is one of the group consisting of hydrogen, methyl, methoxy, ethoxy, nitro, and halogen, the step of conducting the reaction in the presence of an acid binding agent selected from the group consisting of zinc oxide, zinc hydroxide, magnesium oxide and magnesium hydroxide.

2. The process of claim 1 characterized in that the alkyl halide is a primary alkyl halide.

3. The process of claim 2 characterized in that the halide is a chloride.

4. The process of claim 3 characterized in that water formed due to the addition of the acid binding agent is removed from the reaction zone during the reaction.

5. The process of claim 4 characterized in that $R_1$ is hydrogen.

6. The process of claim 5 characterized in that sufficient acid binding agent is introduced into the reaction zone to neutralize at least one-half of the halogen acid formed.

7. The process of claim 5 characterized in that the temperature in the reaction zone is maintained approximately between 150° C. and 250° C.

8. The process of claim 5 characterized in that the acid binding agent is introduced into the reaction zone subsequent to the initiation of the condensation reaction.

9. The process of claim 5 characterized in that the acid binding agent is introduced into the reaction zone progressively as the reaction proceeds.

10. The process of claim 5 characterized in that the acid binding agent is zinc oxide.

11. The process of claim 5 characterized in that the acid binding agent is magnesium oxide.

12. The process of claim 5 characterized in that the acid binding agent is magnesium hydroxide.

13. The process of claim 5 characterized in that zinc chloride is introduced into the zone of reaction in addition to the acid binding agent.

14. The process of claim 5 characterized in that the alkyl halide is butyl chloride.

15. The process of claim 5 characterized in that the alkyl halide is amyl chloride.

16. The process of claim 5 characterized in that the alkyl halide is ethyl chloride.

17. The process of claim 5 in which R is hydrogen.

18. The process of claim 5 in which R is a primary alkyl radical containing less than 9 carbon atoms.

WILLIAM W. LEVIS, JR.

REFERENCES CITED

The following references are of record in the file of this patent:

UNITED STATES PATENTS

| Number | Name | Date |
|---|---|---|
| 1,429,714 | Chatfield | Sept. 19, 1922 |
| 1,925,802 | Heindel | Sept. 5, 1933 |

OTHER REFERENCES

Slotta et al.: "Ber. Deut. chem.," 66, 104–108 (1933).